3,051,728
THIOPHANE DERIVATIVES
Conrad Hans Eugster, Wallisellen, Switzerland, assignor to Geigy Chemical Corporation, Ardsley, N.Y., a corporation of Delaware
No Drawing. Filed Jan. 27, 1961, Ser. No. 85,219
Claims priority, application Switzerland Jan. 28, 1960
6 Claims. (Cl. 260—332.3)

The present invention concerns new thiophane derivatives which have valuable pharmacological properties, as well as processes for the production thereof.

It has been found that new thiophane derivatives corresponding to the general formula

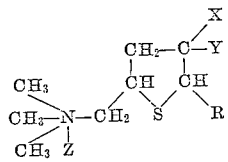

(I)

wherein
R represents hydrogen or the methyl radical,
X represents a hydroxyl group, and
Y represents a hydrogen atom, or
X and Y together represents an oxo radical, and
Z represents a monovalent anion or a normal equivalent of a polyvalent anion,
are obtained by treating a compound of the general formula

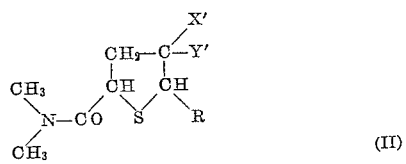

(II)

wherein
X' represents a hydroxyl group and
Y' represents a hydrogen atom or
X' and Y' each represent a low alkoxy group or, together, they represent an oxo radical or the ethylenedioxy group, and
R has the meaning given above, with lithium aluminium hydride in an ether-like solvent, the amount of lithium aluminium hydride used being sufficient to reduce the amide group and any oxo radical present, if the reaction product contains a ketal grouping, converting such product advantageously by acid hydrolysis or transketalisation, into the corresponding free oxo compound, if desired, reducing the latter to the corresponding hydroxy compound, reacting the oxo or hydroxy compound obtained of the general Formula III

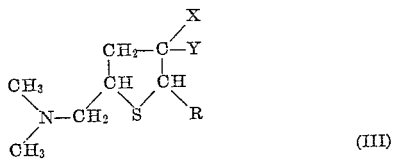

(III)

with a reactive ester of methanol and, if desired replacing the anion provided by the reactive ester by another anion.

The reduction of the amide group and any oxo group present as the first step of the process as well as the reduction of an oxo group if desired as third step of the process can be performed by means of lithium aluminium hydride for example in diethyl ether or tetrahydrofuran or in mixtures thereof at temperatures between about −60° to the boiling temperature of the solvent. However, in the third step, the oxo group can be reduced by treatment with potassium borhydride or sodium borhydride in water or methanol, or by means of catalytically activated hydrogen. Compounds of the general Formula II having a ketal grouping can be converted into compounds having a free oxo group, for example, by boiling with more or less dilute hydrochloric acid. In this process, for example, dimethyl ketals of the general Formula II are hydrolysed under somewhat milder conditions than the corresponding ethylene ketals. Instead of hydrolysis, if desired a transketalisation can be performed, e.g. by boiling ketal compounds of the general Formula II in acetone in the presence of a little toulene sulphonic acid.

On using methyl halides or dimethyl sulphate as quaternising agent, in general Formula I Z is a chlorine, bromine or iodine ion or the ion of methyl sulphuric acid. Ather meanings for Z are obtained advantageously by double reaction, e.g. of quaternary halides with silver salts of the acid desired as anion or by neutralisation of the quaternary base liberated from the quaternary halides by means of moist silver oxide. In this connection, therapeutically useful inorganic and organic acids such as, e.g. phosphoric acid, acetic acid, succinic acid, maleic acid, malic acid, tartaric acid, citric acid or salicylic acid can be used.

Starting materials of the general Formula II are obtained, for example, by esterification of possibly 2-substituted 3-oxo-thiophane-5-carboxylic acid or 2-methyl-3-oxo-thiophane-5-carboxylic acid and possibly acetalisation thereof, e.g. conversion into methyl ester and, if desired, reaction with eythlene glycol or othoformic acid methyl ester. The production of the 3-oxo-thiophane-5-carboxylic acid by adding α-thioacetic acid methyl ester to maleic acid dimethyl ester followed by ring closure according to Dieckmann in the same step and subsequent saponification and decarboxylation of the 3-oxo-thiophane-4,5-dicarboxylic acid dimethyl ester by means of sulphuric acid has been described by H. Fiesselmann and P. Schipprak, (Cem. Ber. 87, 835 (1954)). 2-methyl-3-oxo-thiophane-5-carboxylic acid is obtainable in an analogous manner on using α-thiopropionic acid methyl ester.

The compounds according to general Formula I of this invention possess acetylcholine-like properties such as a strong stimulating action on parasympathetic nerve endings. They are useful for the treatment, by intravenous injection as aqueous solutions, of postoperative intestinal tract paresis and urinary bladder atony due to lesions of the spinal cord.

The following examples further illustrate the process according to the invention without by any means limiting it thereto. The temperatures are given in degrees centigrade.

EXAMPLE 1

(a) 4-keto-thiophane-2-carboxylic acid methyl ester.—82 g. of 4-keto-thiophane-2-carboxylic acid (produced according to H. Fiesselmann and P. Schipprak (Chem. Ber. 87, 835 (1954), 54 g. of anhydrous methanol, 168 ml. of ethylene dichloride and 5.7 ml. of concentrated $H_2SO_4$ are refluxed for 7 hours in a 500 ml. round flask. After cooling, the solution is washed twice with water, then with sodium carbonate solution and again with water. The ethylene dichloride is then distilled off over a column and the residue is fractionated in a distillation flask with reflux collector to which has been attached a 10 cm. long Vigreux column. The desired ester passes over at 102–103°/0.05 Torr and is a yellow oil which quickly solidifies. After recrystallising twice from cyclohexane-ether, the compound is obtained as colourless needles which melt at 42°.

(b) *4,4-ethylenedioxy - thiophane - 2 - carboxylic acid methyl ester.*—66 g. of 4-keto-thiophane-2-carboxylic acid methyl ester, 31 g. of ethylene glycol, 660 ml. of anhydrous benzene and 1.5 ml. of concentrated sulphuric acid are boiled in a 1 litre round flask fitted with a water separating apparatus (e.g. according to Dean-Stark) until 11 ml. of water have been removed (duration about 9 hours). After cooling, the reaction solution is extracted with sodium carbonate solution and water. The organic phase is then dried, the benzene is distilled off and the residue is distilled in vacuo. The 4,4-ethylenedioxy-thiophane-2-carboxylic acid methyl ester boils at 75–85°/0.001 Torr (air bath temperature). The colourless oil crystallises on cooling to under 0°.

(c) *4,4-ethylenedioxy-thiophane-2-carboxylic acid dimethylamide.*—38 g. of the above ethylene ketal and 15.2 g. of anhydrous dimethylamine are heated in a bomb tube for 13 hours at 110° whereupon a brown solution is formed. The excess dimethylamine is then distilled off in vacuo and the remaining oil is fractionated in a distillation flask fitted with reflux collector and a short Vigreux column. The 4,4-ethylenedioxy-thiophane-2-carboxylic acid dimethylamide passes over at 135–140°/0.001 Torr and is a colourless, fairly viscous liquid.

(d) *2-dimethylaminomethyl - 4,4 - ethylenedioxy-thiophane.*—30.5 g. of the dimethylamide distilled as described above but not analytically pure, dissolved in 230 ml. of anhydrous tetrahydrofuran-ether mixture (1:1) are slowly added dropwise under ice cooling to a solution of 8.5 g. of lithium aluminium hydride in 250 ml. of anhydrous ether in a 1 litre flask fitted with stirrer, dropping funnel and reflux condenser. The ice bath is then removed and the reaction mixture is boiled under strong reflux for 5 hours. After again cooling with ice, the excess lithium aluminum hydride is decomposed by means of 100 ml. of 70% methanol. The reaction mixture is then filtered through Celite and the filtrate is evaporated to dryness. The 2-dimethylaminomethyl-4,4-ethylenedioxy-thiophane can be distilled from the residue: it boils at 75–85°/0.001 Torr (air bath temperature).

(e) *2-dimethylaminomethyl-thiophane-4-one.*—15.3 g. of the distilled product obtained according to (d) are mixed with 240 ml. of half concentrated hydrochloric acid and the whole is heated for 20 minutes on the vigorously boiling water bath. The mixture turns brown. It is then cooled in ice and carefully neutralised with ice cold 30% caustic soda lye (pH finally 9). The oil which separates is taken up in ether, the solution is dried with sodium sulphate and the solvent is distilled off in vacuo. On distilling the residue in a bulb tube, the 2-dimethylaminomethyl-thiophane-4-one passes over at 40–50°/0.001 Torr (air bath temperature). In the air the colourless oil quickly turns yellow and after standing for a short time in the air it turns red.

(f) *2-dimethylaminomethyl-thiophane-4-ol (stereoisomeric mixture and its separation).*—A solution of 1.5 g. of lithium aluminium hydride in 50 ml. of ether is cooled to −60 to −70° in a three-necked flask fitted with reflux condenser, dropping funnel and stirrer. 4.1 g. of ketone dissolved in 60 ml. of ether are added dropwise while continually cooling and stirring. On completion of the dropwise addition, the cooling bath is removed and the reaction mixture is stirred for another 2 hours. Excess lithium aluminium hydride is decomposed by the addition of ethyl acetate and then 105 ml. of 15% caustic soda lye are added dropwise at 0°. The ether phase is then isolated and the aqueous phase is extracted with methylene chloride. After drying the combined extracts over sodium sulphate and distilling off the solvent, the 2-dimethylaminomethyl-thiophane-4-ol is obtained as a colourless oil which boils at 40–80°/0.001 Torr (air bath temperature). The substance solidifies on cooling and, after recrystallising from ether/petroleum ether, melts at 42°. It is a stereoisomeric mixture consisting chiefly of the cis-compound.

The trans-compound, if desired, can be obtained by chromatographing the distilled reaction product through an aluminium oxide column, for example, the reaction product can be dissolved in chloroform/hexane 1:1 and absorbed through a column consisting of 80–100 times the amount of aluminium oxide (according to Brockmann, deactivated with 4% water). Mixtures of hexane with increasing amounts of chloroform produce rich eluates of cis-compound. Then the trans-compound is eluated with methanol and distilled in a bulb tube, B.P. 50–60°/0.001 Torr. The distillate is a pale yellow oil which, in contrast to the cis-compound, does not crystallise even by −20°.

In the IR spectrum, the cis compound has an OH-stretching vibration at about 3.23μ which is independent of dilution (due to hydrogen bridges) whilst the OH-stretching vibration of the cis-compound is 2.98μ (chloroform). In addition there are further variations in other absorption bands.

(g) *2-trimethylammoniomethyl-thiophane-4-one iodide.*—2 g. of the basic ketone obtained according to (e) are dissolved in ether and 1 ml. of methyl iodide is added. The ether and excess methyl iodide are evaporated off and the residue is recrystallised from 90% methanol whereby the quaternary iodide is obtained in the form of colourless crystals which melt at 206–207°.

The quaternary chloride is obtained from the iodide by adding silver chloride or an anion exchanger, e.g. Amberlite LRA 400 Cl′. It crystallises from methanol-ether in colourless hygroscopic platelets.

(h) *Cis-2-trimethylammoniomethyl-thiophane-4-ol iodide.*—Crystallised reduction product obtained according to (f) or, advantageously, fractions of a chromatogramme according to (f), eluted with hexane-chloroform mixtures which fractions are rich in cis compound (control by IR spectrum, characteristic OH-stretching vibrations the same as in the tertiary bases, see (f)), are dissolved in ether and about 0.5 ml. of methyl iodide are added per g. of substance. After evaporating off the solvent and excess methyl iodide, the crude product is recrystallised several times from methanol-ether whereby the quaternary iodide is obtained as colourless crystals which melt at 157.5–158.5°. After repeated recrystallisation from acetone-ether, the tetraphenyl borate melts at 167.5–168°. According to the IR spectra, the iodides or tetraphenyl borates so obtained are still not sterically quite uniform however; a better separation of the stereoisomers is attained by fractionated recrystallisation of the L-di-p-toluyl tartrates. 1.5 g. of iodide mixtures rich in cis compound are dissolved in as little as possible hot 80% isopropanol and then a solution of 1.95 g. of L-di-p-toluyl tartaric acid in 10 ml. of warm isopropanol is added. The L-di-p-toluyl tartrate quickly crystallises out in the form of long needles. The fractions ($H_1$–$H_{10}$) obtained by seven triangular fractionated recrystallisations are then individually reconverted by percolation with Amberlite IRA 400 I′ into the quaternary iodides and the latter are crystallised from methanol-ether. The most uniform fractions, based on their IR spectra (e.g. $H_4$–$H_7$) are chosen. They are combined and recrystallised from methanol-ether repeatedly until a constant melting point of 162.5° is attained.

The quaternary chloride obtained from the sterically pure, quaternary iodide analogously to (g), crystallises from isopropanol in fine, very hygroscopic needles which melt at 201°.

(i) *Trans - 2 - trimethylammoniomethyl-thiophane-4-ol iodide.*—The trans-2-dimethylaminomethyl-thiophane-4-ol obtained by chromatography according to (g) is converted, analogously to (h), into the quaternary iodide which, after recrystallisation from methanol-ether, melts at 152–153°. A mixture with the pure quaternary cis compound melts at 154–158°.

By interchange with Amberlite IRA 400 Cl′ and crystallisation from isopropanol-ether, the chloride of the quaternary trans compound is obtained in fine, colourless, very hygroscopic little needles which melt at 188°.

EXAMPLE 2

(a) *4-keto-5-methyl-thiophane-2,3-dicarboxylic acid dimethyl ester.*—89.3 g. of finely pulverised, alcohol-free sodium methylate and 270 ml. of anhydrous benzene are put into a three litre four-necked flask fitted with stirrer, dropping funnel, reflux condenser and a tube for the introduction of gas. A solution of 200 g. of α-thio-propionic acid methyl ester in 192 ml. of anhydrous benzene and then a solution of 240 g. of maleic acid dimethyl ester in 1.4 litres of benzene are then added dropwise while stirring and introducing nitrogen. An orange coloured solution is formed which is refluxed for 3 hours. After cooling, the reaction solution is extracted several times with water and the combined extracts are acidified with sulphuric acid. A red-brown oil separates out which is taken up in benzene. The benzene solution is dried, the solvent is evaporated off and the residue is distilled in a high vacuum. The desired product passes over at 91–93°/0.005 Torr. It is a colourless oil which solidifies on cooling. After recrystallisation from anhydrous methanol, it melts at 76–77°.

(b) *5-methyl-4-keto-thiophane-2-carboxylic acid.*—200 g. of 5-methyl-4-keto-thiophane-2,3-dicarboxylic acid dimethyl ester and 1.68 litres of 10% sulphuric acid are refluxed for 3 hours whereupon a homogeneous solution is obtained. After being cooled, this is exhaustively extracted with ether. The combined ether solutions are dried, evaporated and the residue is distilled. The 5-methyl-4-keto-thiophane-2-carboxylic acid boils at 100–123°/0.001 Torr and is a yellow oil which soon solidifies crystalline. After recrystallisation from benzene-ligroin, it melts at 61–62°.

(c) *5-methyl-4-keto-thiophane-2-carboxylic acid methyl ester.*—426 g. of the above acid and 280 g. of anhydrous methanol, 875 ml. of 1,2-dichloroethane and 29.2 ml. of concentrated sulphuric acid are refluxed for 16 hours. The mixture is then washed with water, sodium bicarbonate solution and again with water, dried and concentrated. The methyl ester which remains distills at 79–85°/0.7 Torr.

(d) *5 - methyl - 4,4 - dimethoxy - thiophane - 2 - carboxylic acid methyl ester.*—50 g. of 5-methyl-4-keto-thiophane-2-carboxylic acid methyl ester are mixed in a 500 ml. round flask with 92.5 g. of pure ortho-formic acid methyl ester and 60 g. of pure anhydrous methanol. 12.5 ml. of methanol which have been saturated with hydrogen chloride under ice cooling are added thereto. The reaction mixture is then boiled under reflux for exactly 30 minutes while excluding water and then the mixture, while still hot, is poured into 1 litre of ice and water. A yellow oil separates. The whole is then buffered with 30% caustic soda lye to pH 8 while stirring and, if necessary, with the addition of further ice, after which it is extracted with ether. After drying and evaporating the ether solution and distilling the residue, the desired dimethyl ketal is obtained as a pale yellow oil which boils at 68–76°/0.001 Torr. (Short Vigreux column). Pure substance for analysis is obtained by distillation on the spinning band column; boiling point 123–126°/11 Torr.

(e) *5 - methyl - 4,4 - dimethoxy - thiophane - 2 - carboxylic acid dimethyl-amide.*—25 g. of the above dimethyl ketal and 13 g. of anhydrous dimethylamine are heated in a bomb tube for 7 hours at 120°. After removal of excess dimethylamine in vacuo the brown residue is distilled. The desired dimethylamide passes over at 114–126°/0.001 Torr. It is a yellow oil which is sensitive to light and has an unpleasant smell.

(f) *2 - dimethylaminomethyl - 4,4 - dimethoxy - 5-methyl-thiophane.*—A clear solution of 24.4 g. of lithium aluminum hydride in 750 ml. of ether is put into a 4 litre three-necked flask fitted with stirrer, reflux condenser and droppnig funnel. (Content titrimetrically determined). A solution of 100 g. of the dimethylamide obtained according to (e) in 1.2 litres of a mixture of tetrahydrofuran-ether (1:1) is added dropwise while stirring and cooling with ice and the whole is boiled for 3 hours. The excess lithium aluminum hydride is then decomposed with 70% methanol while cooling with ice and then the reaction mixture is clarified by filtering through Celite, the filter cake being washed with ether. The filtrate is evaporated in the vacuum, water is added to the residue and it is extracted with pure ether. The combined ether extracts are dried and concentrated. Distillation of the orange coloured residue produces 2-dimethylaminomethyl-4,4-dimethoxy-5-methyl-thiophane as an almost colourless oil which is sensitive to light and boils at 55–89°/0.001 Torr.

(g) *2 - dimethylaminomethyl - 5 - methyl - thiophane-4-one.*—A mixture of 60 g. of the substance obtained according to (f) and 1.5 litres of 0.5 N-hydrochloric acid are heated in an Erlenmeyer flask for 30 minutes on a vigorously boiling water bath. The solution is then cooled with ice and made alkaline with 30% caustic soda lye. The basic keto compound is separated by repeated extraction with ether, the combined extracts are dried, evaporated and the oil which remains is distilled in vacuo. It boils at 38–55°/0.001 Torr. Pure substance for analysis can be obtained, for example, by distillation through a Büchi-Abegg spinning band column at a return flow ratio of 30:1. B.P. 112–113°/11 Torr.

The substance is very sensitive to light and quickly becomes red coloured with resinification. In the IR spectrum there is a C=O absorption band at 1733 cm.$^{-1}$.

The hydrochloride of the tertiary base prepared with methanolic hydrochloric acid melts, after recrystallisation from isopropanol, at 173.5–174.5°; the acid oxalate melts at 122.5–123.5° (recrystallised from ethanol), and the phenyl semicarbazone melts at 175–175.5°.

(h) *2 - dimethylaminomethyl - 5 - methyl - thiophane-4-ol (stereoisomeric mixture).*—4.38 g. of lithium aluminium hydride are dissolved in 150 ml. of ether in a 1 litre three-necked flask fitted with a stirrer, dropping funnel and reflux condenser. 11.5 g. of 5-methyl-2-dimethyl-aminomethyl-thiophane-4-one dissolved in 110 ml. of anhydrous ether are added dropwise under ice cooling, the addition being made slowly and while continually stirring. After stirring for another 3 hours at room temperature the reaction solution is again cooled with ice, then 70% methanol is added and the whole is filtered through a layer of Celite. The filtrate is stirred at 0° into 295 ml. of 15% aqueous caustic soda lye. The ethereal phase is separated and the aqueous phase is extracted several times with methylene chloride. After washing with saturated sodium chloride solution, drying over sodium sulphate and concentrating, the ether and methylene chloride solutions produce the crude stereoisomeric mixture which boils at 55–90°/0.001 Torr. The distillate is a yellowish oil which is sensitive to oxidation.

The pure cis isomer (cis with regard to the relative position of the hydroxy group and the dimethylaminomethyl group at the thiophane ring) can be separated from the stereoisomeric mixture by distillation through a very active column while controlling the fractionation by IR spectroscopy. (The cis compound has an OH stretching vibration which is independent of dilution at about 3.22μ; that of the trans compound however is at 2.95μ). The cis compound passes over at 126.5–128°/10–11 Torr, and it crystallises on cooling. Recrystallised from methylene chloride/ligroin, it melts at 55–56°

The hydrochloride of the cis isomer is obtained by reacting the base with methanolic hydrochloric acid, evaporating off the solvent and recrystallising the residue from isopropanol-ether. M.P. 127–127.5°.

The pure trans compound can be obtained by chromatography through a deactivated aluminium oxide column analogous to Example 1f, the trans fractions being identified by IR spectroscopy (position of OH stretching vibration see above). In the bulb tube, the trans compound passes over at 65–75°/0.001 Torr (air bath temperature). It can be purified by way of the hydrochloride prepared with methanolic hydrochloric acid. The hydrochloride melts, after recrystallisation from isopropanol-ether, at 177°.

(*i*) *Methoiodides of the tertiary basic ketone and of the tertiary basic hydroxy compound.*—The 2-trimethylammoniomethyl-5-methyl thiophane-4-one iodide (M.P. 206° recrystallised from 80% ethanol), or cis-2-trimethylammoniomethyl-5-methyl-thiophane-4-ol iodide (M.P. 174–174.5° after recrystallisation from 98% methanol) and trans-2-trimethylammoniomethyl-5-methyl-thiophane-4-ol iodide (M.P. 179° recrystallised from ethanol) are obtained analogously to Example 1g and h from the tertiary bases produced according to Example 2g and h by means of methyl iodide in ether.

What I claim is:

1. A thiophane derivative of the formula

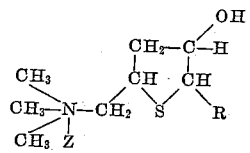

wherein R is a member selected from the group consisting of hydrogen and methyl, and Z is an anion of a therapeutically useful acid.

2. A thiophane derivative of the formula

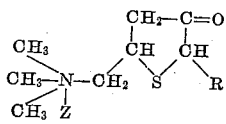

wherein R is a member selected from the group consisting of hydrogen and methyl, and Z is an anion of a therapeutically useful acid.

3. A thiophane derivative of the formula

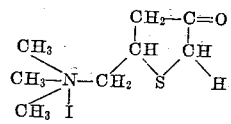

4. A thiophane derivative of the formula

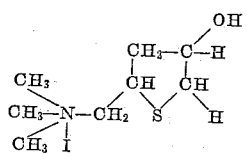

5. A thiophane derivative of the formula

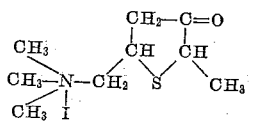

6. A thiophane derivative of the formula

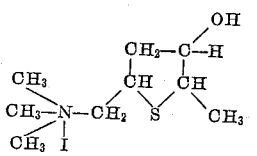

References Cited in the file of this patent

UNITED STATES PATENTS 2,408,519     Avison et al. _____ Oct. 1, 1946
2,543,318     Hartough _____ Feb. 27, 1951

OTHER REFERENCES

Brown et al.: Jour. Organic Chemistry, vol. 12, pp. 483–5 (1947).